(12) United States Patent
Jo

(10) Patent No.: US 9,258,626 B2
(45) Date of Patent: Feb. 9, 2016

(54) ANNOTATING AN OBJECT IN A VIDEO WITH VIRTUAL INFORMATION ON A MOBILE TERMINAL

(71) Applicants:Guen Sik Jo, Yonghyeon-dong, Nam-gu, Incheon (KR); Inha Industry Partnership Institute, Incheon (KR)

(72) Inventor: Geun Sik Jo, Incheon (KR)

(73) Assignees: Geun Sik Jo, Incheon (KR); Inha Industry Partnership Institute, Incheon (KR)

(*) Notice: Subject to any disclaimer, the term of this patent is extended or adjusted under 35 U.S.C. 154(b) by 74 days.

(21) Appl. No.: 13/910,666

(22) Filed: Jun. 5, 2013

(65) Prior Publication Data

US 2014/0157303 A1 Jun. 5, 2014

(51) Int. Cl.
| | |
|---|---|
| *H04N 7/10* | (2006.01) |
| *G06F 3/00* | (2006.01) |
| *G06F 13/00* | (2006.01) |
| *H04N 5/445* | (2011.01) |
| *H04N 21/84* | (2011.01) |
| *H04N 21/41* | (2011.01) |
| *H04N 21/435* | (2011.01) |
| *H04N 21/478* | (2011.01) |
| *H04N 21/81* | (2011.01) |
| *H04N 21/472* | (2011.01) |
| *G06F 17/24* | (2006.01) |

(52) U.S. Cl.
CPC ........... *H04N 21/84* (2013.01); *H04N 21/4126* (2013.01); *H04N 21/435* (2013.01); *H04N 21/478* (2013.01); *H04N 21/47205* (2013.01); *H04N 21/812* (2013.01); *G06F 17/241* (2013.01)

(58) Field of Classification Search
CPC ................ H04N 21/23412; H04N 21/234318; H04N 21/47205; H04N 21/858; H04N 21/84; H04N 21/2668
USPC ...................................... 725/32, 60
See application file for complete search history.

(56) References Cited

U.S. PATENT DOCUMENTS

| | | | | |
|---|---|---|---|---|
| 2009/0006937 | A1* | 1/2009 | Knapp et al. | 715/205 |
| 2009/0327894 | A1* | 12/2009 | Rakib et al. | 715/719 |

* cited by examiner

*Primary Examiner* — Benjamin R Bruckart
*Assistant Examiner* — Akshay Doshi
(74) *Attorney, Agent, or Firm* — Madeline F. Schiesser; Keohane & D'Alessandro, PLLC

(57) ABSTRACT

Embodiments of the present invention provide a visual interlock system for providing product information by displaying video content annotated with virtual information (stored as metadata) such as advertisement information or a social network service (SNS) message from a friend. Specifically, among other things, embodiments of the present invention provide a system that allows a video playing on a television to be simultaneously played on a mobile device. The system searches for virtual information related to a visual object in the video. The virtual information is stored as metadata. The virtual object in the video is annotated with the virtual information. The annotated video is displayed on the user terminal.

22 Claims, 19 Drawing Sheets

US 9,258,626 B2

ANNOTATING AN OBJECT IN A VIDEO WITH VIRTUAL INFORMATION ON A MOBILE TERMINAL

CROSS-REFERENCE TO RELATED APPLICATION

This application claims the priority benefit of Korean Patent Application No. 10-2012-0006601, filed on Jan. 20, 2012, and Application No. 10-2012-0008589, filed on Jan. 27, 2012, in the Korean Intellectual Property Office, the disclosure of which is incorporated herein by reference.

TECHNICAL FIELD

In general, embodiments describe herein relate to an approach for annotating video playback. In a typical embodiment, the present invention relates to generating product or advertising information (i.e., metadata) related to one or more visual objects for display on a mobile terminal.

BACKGROUND

Advertising has become a pervasive part of our society. Since the 1950's when television (TV) was introduced on a mass scale to television viewing households, advertisers have had the ability to address and deliver advertising content to TV audiences. However, by the mid-2000's, as the Internet grew to hundreds of millions of users worldwide, and technology became faster and more efficient, a new smart client devices industry began to emerge with devices being connected (sometimes wirelessly) to the Internet, changing how many people view video content.

Advertisers seek to capitalize on this new industry by looking for ways to incorporate advertisements into a user's interaction with a smart client device. In the past, advertisements were strictly one-way communication. For example, if a user is interacting with a smart client device while viewing video content (either a television broadcast or via the Internet), there exists the opportunity to provide an advertisement to the user that is coordinated with the presentation and the video content. Traditionally, in direct marketing schemes using advertising content, a seller would register and maintain product metadata on a separate platform. Due to space-time constraints, the seller may not freely register and maintain such metadata. A way to purchase a product related to a television (TV) advertisement may be offered. However, a user searching for or purchasing a product during the content viewing experience may interfere with another user viewing the same content. Also, since current TV environments lack structural flexibility for users to search for information on the Internet or confirm an information search, offering a user interactive experience where users search for information or visit a shopping site to purchase the product may be limited and inconvenient.

SUMMARY

In general, embodiments of the present invention provide a visual interlock system for providing product information by displaying video content annotated with virtual information (stored as metadata) such as advertisement information or a social network service (SNS) message from a friend. Specifically, among other things, embodiments of the present invention provide a system that allows a video playing on a television to be simultaneously played on a mobile device. The system searches for virtual information related to a visual object in the video. The virtual information is stored as metadata. The virtual object in the video is annotated with the virtual information. The annotated video is displayed on the user terminal.

A first aspect provides a video interlock system for displaying annotated video, comprising: an interlock module configured to request a Network Screen (Nscreen) service based on a user request, wherein the NScreen service allows for simultaneously displaying a video being played on a first device to be played on a second device; a search module configured to search for virtual information associated with a visual object in the video, wherein the virtual information is stored as metadata in a metadata maintenance server; an annotation module configured to annotate the visual object in the video with the virtual information; and a display module configured to display the annotated video annotated on the second device.

A second aspect provides a method for displaying annotated video annotated, comprising: requesting a Network Screen (Nscreen) service based on a user request, wherein the NScreen service allows for simultaneously displaying a video being played a first device to be placed on a second device; searching for virtual information related to a visual object in the video, wherein the virtual information is stored as metadata in a metadata maintenance server; annotating the visual object in the video with the virtual information; and displaying the video annotated with the metadata on the second device.

A third aspect provides a computer program product for displaying annotated video annotated, the computer program product comprising a computer readable storage media, and program instructions stored on the computer readable storage media, to: request a Network Screen (Nscreen) service based on a user request, wherein the NScreen service allows for simultaneously displaying the video being played a first device to be placed on a second device; generate virtual information associated with a visual objects in the video, wherein the virtual information is stored as metadata; search for metadata related to a visual object in the video, wherein the metadata is stored in a metadata maintenance server; annotate the visual object in the video with the virtual information; and display the annotated video on the second device.

BRIEF DESCRIPTION OF THE DRAWINGS

These and other features of this invention will be more readily understood from the following detailed description of the various aspects of the invention taken in conjunction with the accompanying drawings in which.

Figure 1:
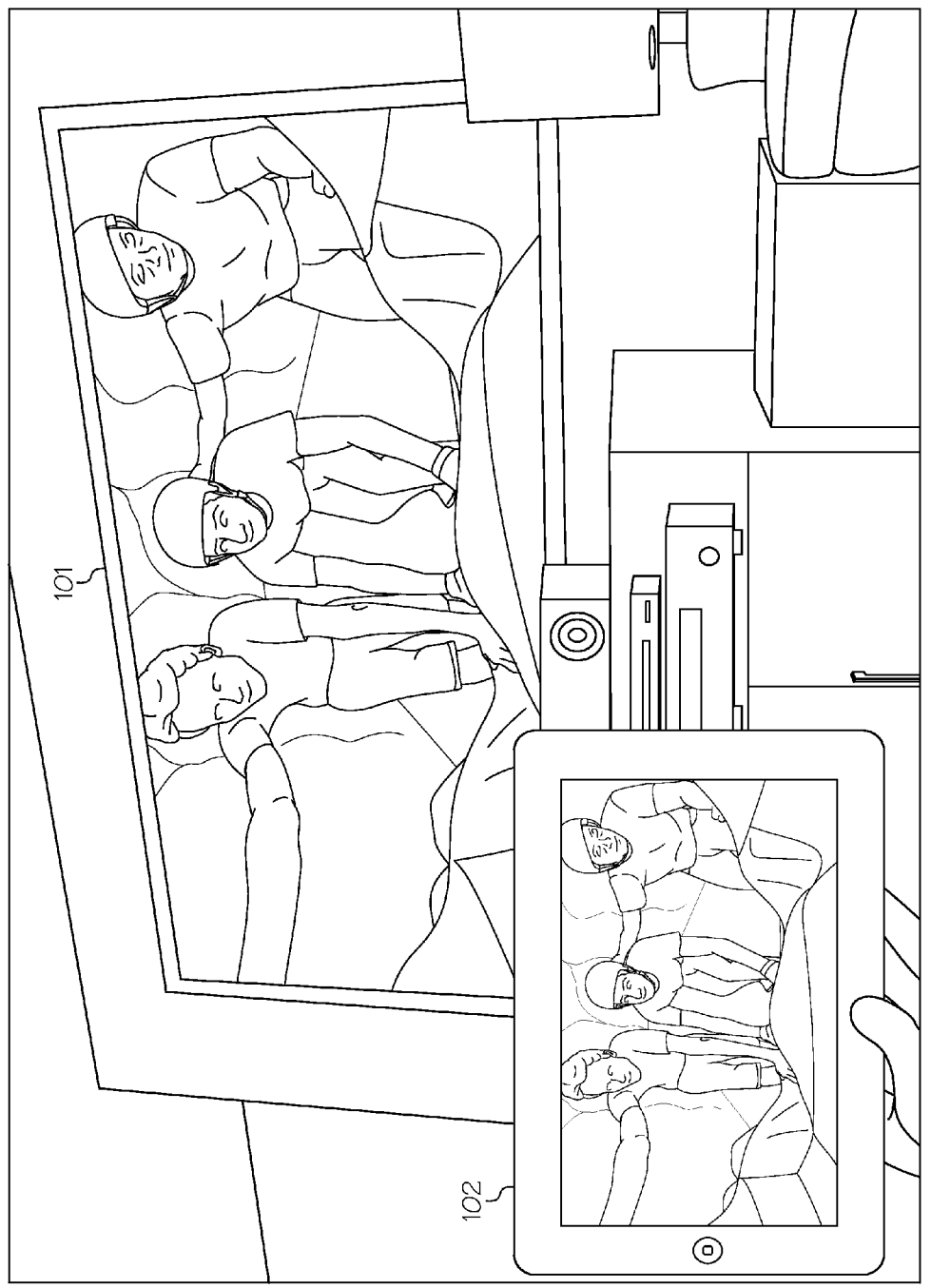
FIG. 1 depicts a video interlock system playing video in a smart television (TV) environment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The term "seller" herein refers to any seller of a product, any advertiser of a product, any representative of a seller of a product, or any representative of an advertiser of a product.

As indicated above, embodiments of the present invention provide a visual interlock system for providing product information by displaying video content annotated with virtual information (stored as metadata) such as advertisement information or a social network service (SNS) message from a friend. Specifically, among other things, embodiments of the present invention provide a system that allows a video playing on a television to be simultaneously played on a mobile device. The system searches for virtual information related to a visual object in the video. The virtual information is stored as metadata. The virtual object in the video is annotated with the virtual information. The annotated video is displayed on the user terminal.

FIG. 1 depicts a visual object interlock system playing video in a smart television (TV) environment. As shown, a user (e.g., potential buyer) may watch a video content of a skateboarder on a smart TV 101. The user may wish to search product information of the skateboarder's helmet so the user activates a NScreen service on his smart mobile device (in this example, smart tablet 102). The NScreen service may provide the ability to watch the same video content on the smart TV 101 and the smart tablet 102. The video interlock system may track the user's actions on the smart tablet 102 to determine when product metadata may be displayed. For example, the user may perform a predefined action (such as lifting up the smart tablet 102) to trigger the system to display the product metadata. One or more user actions may be defined to trigger product metadata display when one of the predefined actions is performed by the user. After the action is performed, the video interlock system may offer metadata provided by the advertiser (or seller) related to the video content to the smart tablet. In one example, the metadata may overlay (or overlap) a portion of the video content. In another example, the metadata may be displayed on a split screen (next to the video content) so as not to overlap or cover any of the video content. Furthermore, the video interlock system (system) may analyze a profile of the user's and/or the users' peer group to offer metadata based on the analysis to provide only metadata to the smart tablet 102 that may be relevant to the user.

The metadata displayed in the smart tablet 102 may have user interactive functions such as selection and/or search capabilities (e.g., by mouse click or touch). The user may be able to connect to the Semantic Web (Internet) and search for additional product information. The system may send the user to an Internet website where the user may purchase the product when the user selects (e.g., by mouse click or touch) the product or product information displayed in the video content.

The functions of the video interlock system are described in detail below.

The advertiser (e.g., seller or advertiser representing the seller) may find and locate a specific area in the video content in which to display the related product metadata to provide product information and a way to connect the user to a website to purchase the product. The product metadata may be stored separately from the video content so that addition, deletion, modification, sharing, and/or reuse of the product information are available.

The user wishes to receive product information on the smart tablet 102 that is playing the same video content as smart TV 101. To indicate product interest, the user may perform a predefined action (such as lifting up) on the smart tablet 102. The action may activate a service (herein referred to as "NScreen service") on the smart tablet 102 to augment the video content with product advertising information (i.e., the product metadata or virtual information stored as metadata).

The metadata related to the video content may be displayed on the smart tablet 102. If the metadata is connected to a shopping Internet site, the user may move to the site for product purchase upon selecting (by mouse click, touch, or other means) on the product or product metadata.

The product information may include location information. In one example, the system may provide the nearest seller location based on the user's current location. For example, if the product of interest is a restaurant food item, the system may return the nearest restaurant location closest to the current location of the user.

In one example, product metadata provided to the user may be personalized. In other words, the system may determine a user's interests based upon using a predefined user profile. For example, the user profile may reflect that the user is interested in skateboarding. However, the user is solely interested in apparel, specifically jeans and t-shirts. In this case, helmet and shoe information will not be displayed. Only product information relating to skateboarder's t-shirt and jeans will be provided to the smart tablet 102.

The visual object interlock system works with a smart TV and a smart mobile device. The smart mobile device may be associated with a user or seller (or seller's representative such as an advertiser). The term "user terminal" used below refers to the smart mobile device associated with the user. The term "seller terminal" used below refers to the smart mobile device associated with a seller (or seller representative). The user terminal and seller terminal may include, but are not limited to, smart devices such as smart phones, tablets, smart personal data assistants (pda's), or similar electronic devices which are Internet-enabled and may include a programmable processor or dedicated graphics processing chip, memory, and a display. The examples listed above are exemplary only and not intended to be limiting.

In some examples, the visual object interlock system may operate in a Linking Open Data (LOD)-based environment. In computing, linked data describes a method of publishing structured data so that it may be interlinked and become more useful. It builds upon standard Web technologies such as Hypertext Transfer Protocol (HTTP) and Uniform Resource Identifiers (URIs), but rather than using them to serve web pages for human readers, it extends them to share information in a way that may be read automatically by computers. This enables data from different sources to be connected and queried.

Semantic Web supports the LOD method. The Semantic Web is a collaborative movement led by the international standards body, the World Wide Web Consortium (W3C). The W3C promotes common data formats on the Internet. By encouraging the inclusion of semantic content in web pages, the Semantic Web aims at converting the current web dominated by unstructured and semi-structured documents into a "web of data".

Figure 2:
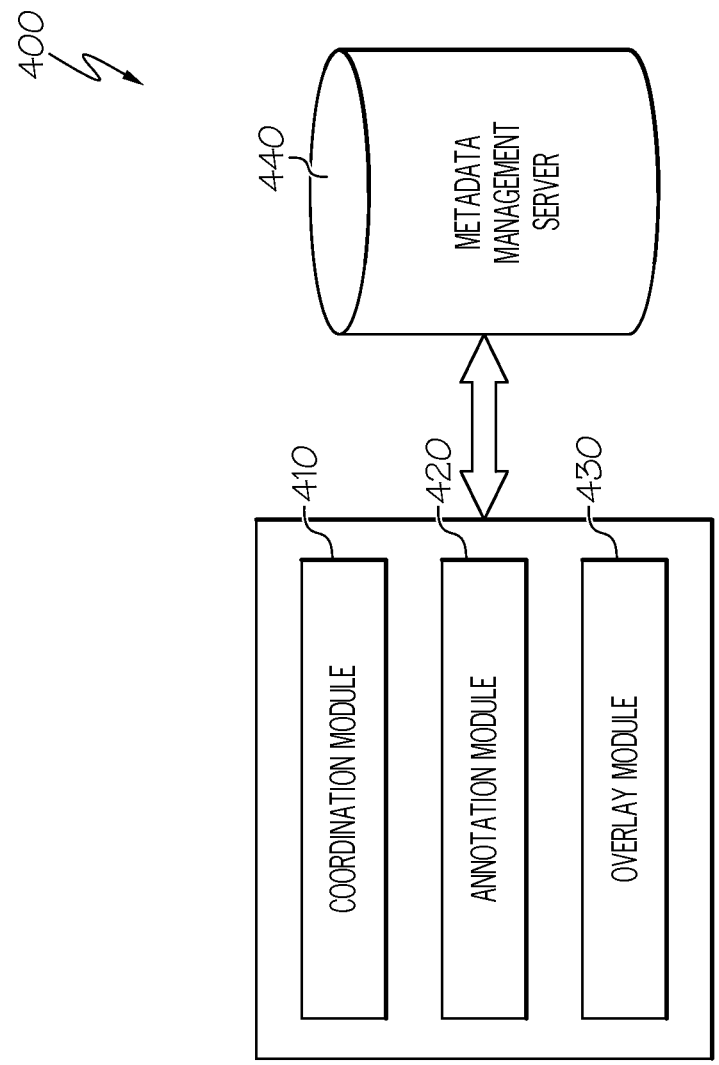
FIG. 2 depicts a schematic diagram of a visual object interlock system

FIG. 2 depicts a schematic diagram of a visual object interlock system 400. As shown, the visual interlock system 400 includes coordination module 410, annotation module 420, and overlay module 430. The visual interlock system 400 may communicate with metadata maintenance server 440. The visual interlock system 400 offers diverse sellers to collaboratively market their products. That is, a seller (or advertiser) may generate information on a product of interest (i.e., a visual object) in video content by annotating the product at any point in the video content. The annotation method of a visual object in video content may be diverse. The annotation method is based on utilizing a touch screen in which a user touches on a specific area to annotate a video object with metadata.

The coordination module 410 may allow for an NScreen request. The Nscreen request allows for simultaneously displaying the same video content on a smart TV and a seller terminal according to a seller request. The annotation module 420 may provide an annotation function related to the video content. The seller may select a particular visual object in the video content playing on the seller terminal (that is, a particular item appearing in the video content). When the seller inputs metadata related to the visual object, the metadata may be annotated onto the visual object.

The annotation module 420 may activate an annotation tool (not shown) which receives the metadata from the seller related to the selected visual object in the video content. The metadata may include (among other things) at least one of the following: product category, price, description, shipping information, multimedia data, social network service (SNS) message, and/or uniform resource locator (URL) address. In one example, the annotation tool may include an input tool which selects data related to metadata in an LOD-based Symantec Web. Alternatively, or in addition, the seller may directly input information using the input tool. The annotation module 420, through the annotation tool, may store and maintain the virtual information (stored as metadata) inputted by the seller independently from the video content which may be stored and maintained in the contents server. The virtual information may be stored and maintained as metadata in the metadata maintenance server 440. The metadata maintenance server 440 may offer an LOD-based Symantec Web environment to allow deletion, modification, addition, reuse, and/or sharing of metadata by the seller.

In one example, the annotation module 420 may have tracking and/or interpolating capabilities. As such, the annotation module 420 may track a location of an annotated visual object. The movement route of such object may be stored in relation to seller inputted metadata. Visual tracking and visual interpolating capabilities are currently known. Tracking capability may track an object's location (from the first frame on screen after selection) on a screen by utilizing a tracking signal on the visual object once the object is selected by the seller in the video content. The visual interpolating capability, by repeatedly storing the seller's selection process in constant time intervals once an object is selected by a seller, may track down the object's movement route. The visual object's area and location information may be included in the metadata. When an object for annotation appears in video content, the seller may designate the object area. In one example, the seller may designate the area using a finger. In other examples, the seller may designate the area by other means. By using tracking or interpolating capabilities to complete the tracking of the seller's selected object, annotation in terms of location information (i.e., x-axis, y-axis) concerning the object's comprehensive movement route from first frame to last is made possible.

After the metadata input process is complete, the overlay module 430 may offer metadata configuration through the seller's terminal. The seller may directly configure targeting information (e.g., gender, age, profession, location) and a display method for display of metadata on the screen of user's terminal. At this time, the metadata's targeting information and display method may be stored in the metadata maintenance server 440 and deletion, modification, addition, reuse, and sharing by the seller are made possible.

Figure 3:
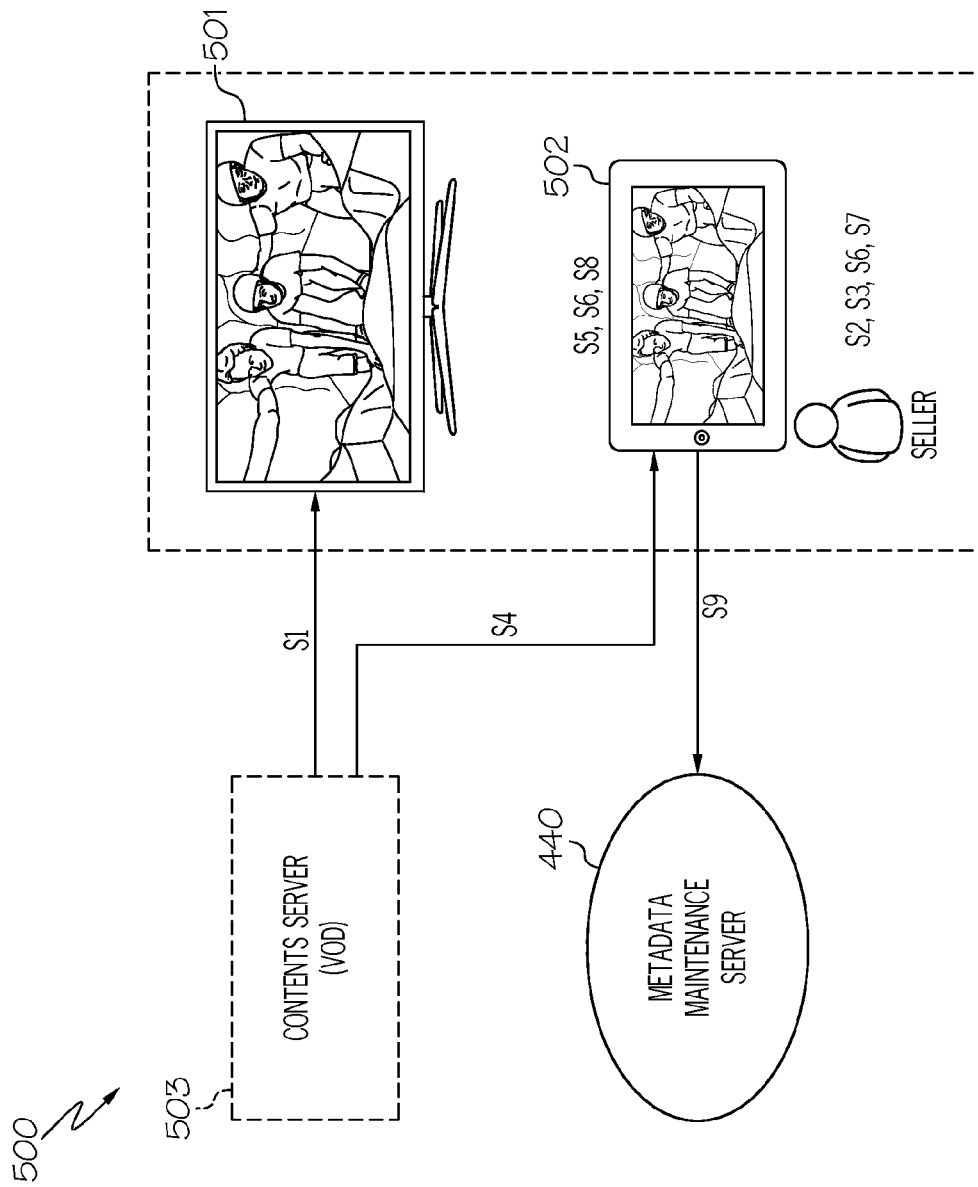
FIG. 3 depicts a schematic diagram illustrating the generation of metadata by a seller.

FIG. 3 depicts a schematic diagram illustrating the generation of metadata by a seller. At S1, a seller selects video content existing in contents server 503 in a smart TV 501 and begins watching the video content. At S2, while watching the content, when a product of interest appears which the seller wants to market, the seller may generate additional information (i.e., virtual information stored as metadata) related to that product. At S3, the seller, on his mobile device (e.g., seller terminal 502) may initiate an application related to the video as well as visual object interlock system. At S4, the video content, as well as the visual object interlock system, utilizes the NScreen service from contents server 503. At this time, the same video content is played on both smart TV 501 and seller terminal 502. At S5, the seller selects (by either touching or clicking) the product in video content played in seller terminal 502. The video content being played on seller terminal 502 is paused. On the screen of seller terminal 502, the annotation tool is being implemented. At S6, the seller, in the ontology (LOD) environment, may select a category in which the product belongs through the annotation tool. The user may input information to be displayed to a user (e.g., price, product description, shipping information, product image, URL address). At S7, the input tool on the screen of the seller terminal 502 related to coordination may be implemented after the metadata input process is completed. Here, the seller may directly input targeting information of a person who will be able to view product information (personal profile) (e.g., 20 years old, male, student, residency in a particular city). At S8, the designation of how to display the targeting information on a user screen may be completed after the seller has finished inputting the targeting information. Display methods are discussed in greater detail below with reference to FIGS. 12*a-h*. At S9, the inputted metadata, targeting information, and display method may then be annotated on the object and stored in the metadata maintenance server 440.

Figure 4:
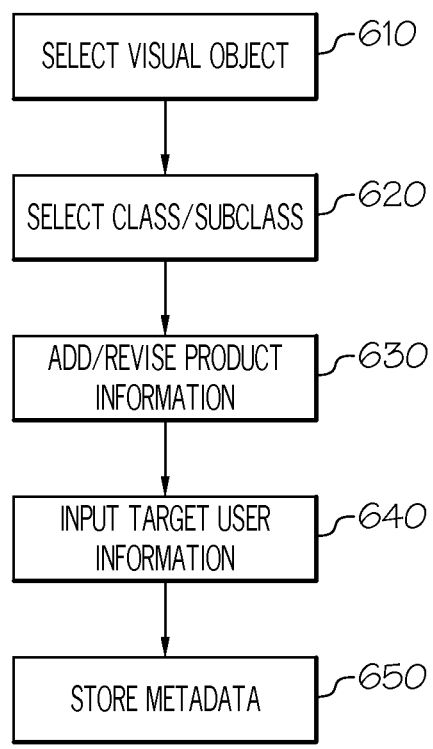
FIG. 4 depicts a method flow diagram for generating metadata in video content using a visual interlock system.

FIG. 4 depicts a method flow diagram for metadata generation in video content using a visual interlock system. The seller may request an NScreen service using the visual interlock system allowing for simultaneous display of the same video content on both a smart TV and a seller terminal. At 610, the seller selects a particular object in the video content played on the seller terminal. The application tool may be used to input metadata related to that particular object on the seller terminal.

Figure 5:
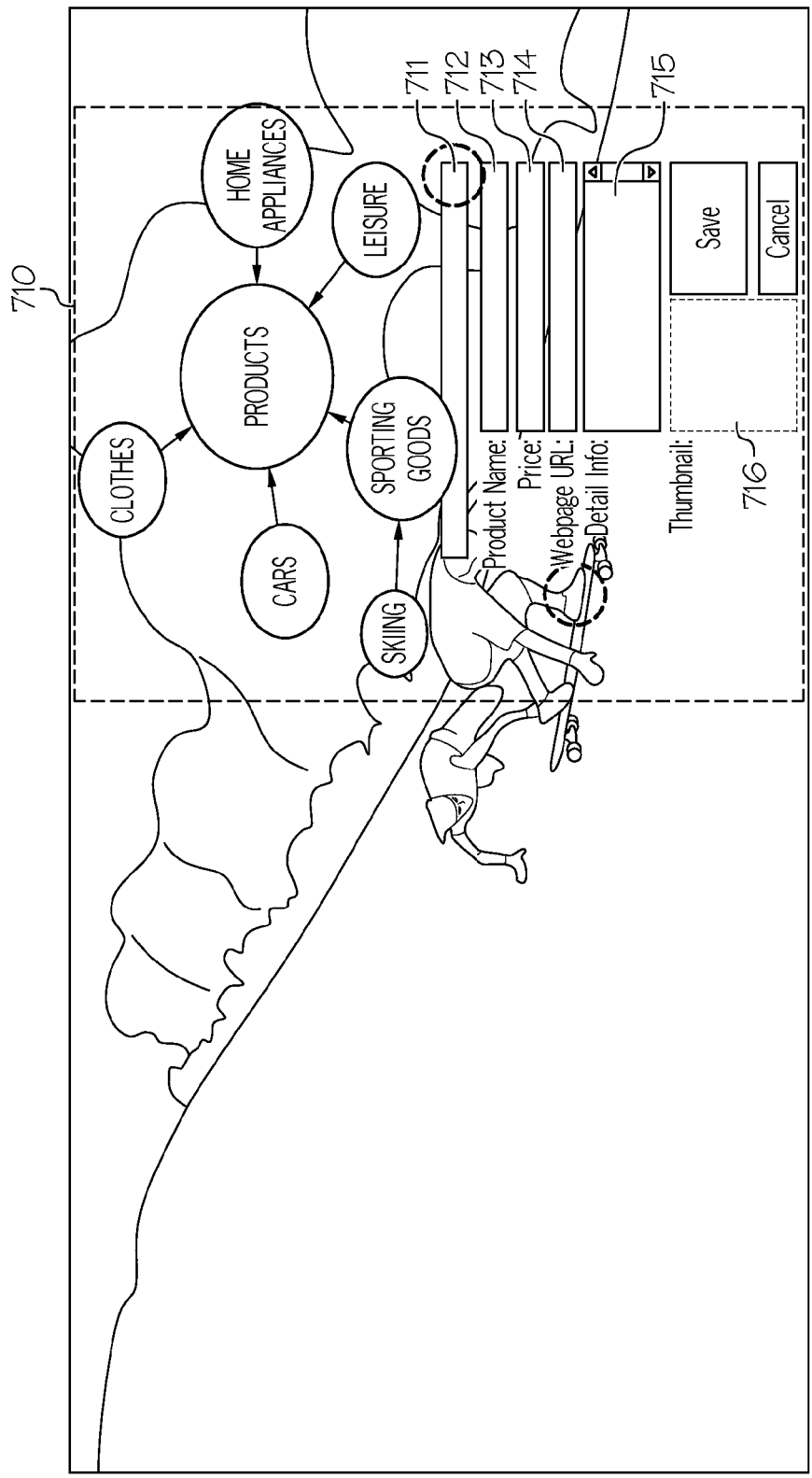
FIG. 5 depicts an annotation tool in the visual interlock system.

FIG. 5 depicts an annotation tool in the visual interlock system. When seller clicks a product of interest while watching video content in the seller terminal, a display screen (i.e., annotation tool 710) for inputting information related to the product may be displayed. The annotation tool 710 may include category selection window 711, title input window 712, price window 713, URL input window 714, detailed description window 715, and thumbnail input window 716. The category selection window 711 may be used to input a product category for the product in the LOD-based Symantec web page. The title input window 712 may be used to input a product title for the product. The price input window 713 may be used to input a product price. The URL input window 714 may be used to input a URL where the product may be purchased (e.g., URL of a store or mall). The detailed description window 715 may be used to describe the product and/or input shipping information. The thumbnail input window 716 may be used to input a product image. The examples above are exemplary only and not intended to be limiting. Other windows may be used to input information or data related to the product for advertising purposes.

Referring back to FIG. 4, the seller may select a predefined class or subclass from the Semantic Web at 620 rather than manually inputting the product information. A class and one or more subclasses may be selected from the LOD (Linking Open Data) which have been previously published by others. The (LOD) information is predefined product information. In other words, the seller may receive product information through seller input or the seller may select a class and one or more subclasses which are associated with particular product information.

Figure 6:
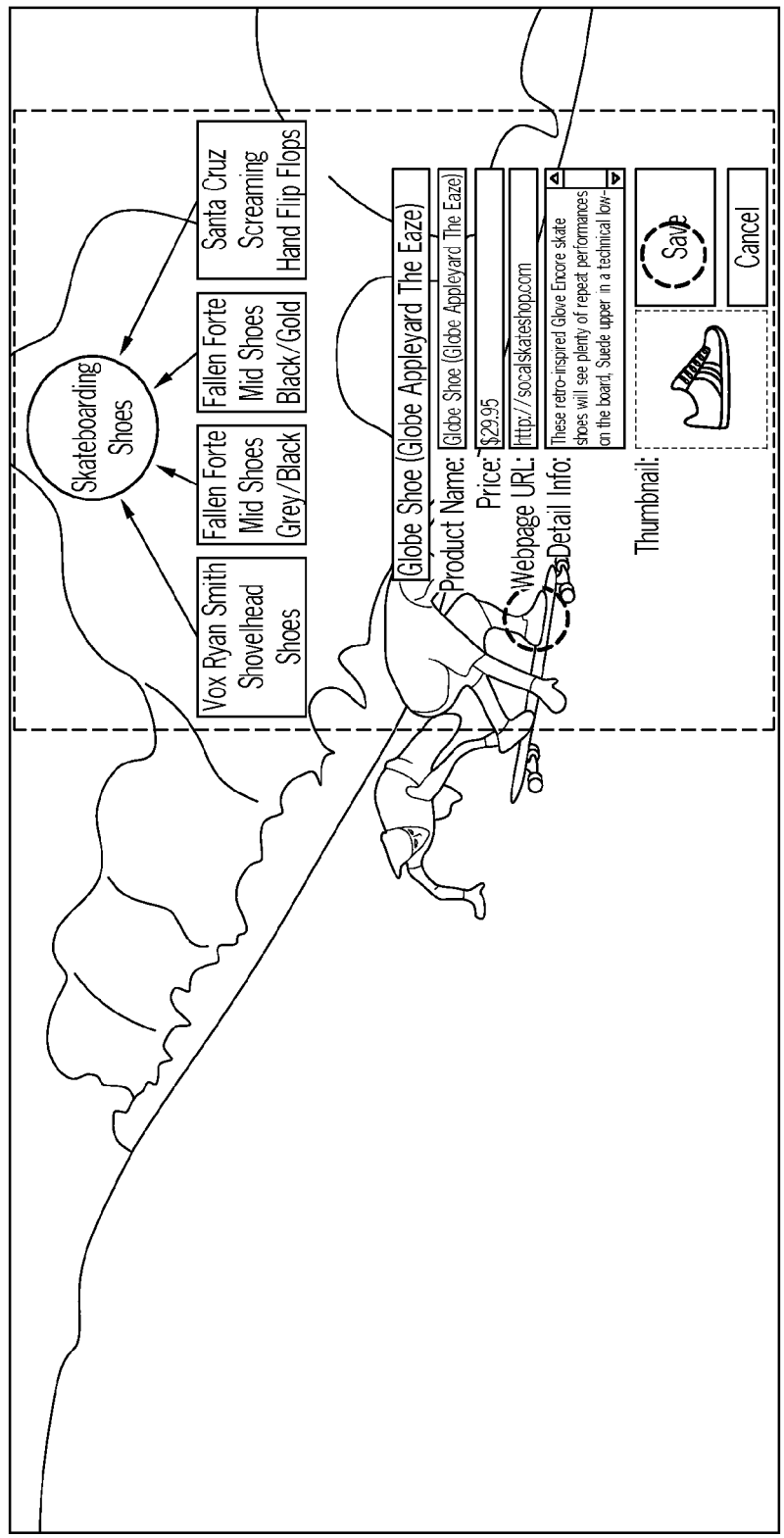
FIG. 6 depicts a display of product information of a product selected by a seller.

At 630, the visual object interlock system may offer an environment where addition and modification of seller inputted metadata is possible. FIG. 6 depicts a display of product information of a product selected by a seller. The seller may edit the product information being displayed. Upon saving the modified product information (e.g., by selecting a 'save' button), the modified product information may be updated in the LOD environment.

Figure 7:
FIG. 7 depicts a display configuration window for configuring targeting information and a display method.

At step 640, the seller may configure targeting information and a display method prior to saving product information (i.e., metadata) inputted by seller. As illustrated in FIG. 7, a display configuration window 910 may be displayed on the seller's terminal in order to configure targeting information and a display method once product information input is completed. Here, the seller may configure a range of potential customers (i.e., users) to whom product information is exposed and how to display such information on a user's screen. Targeting information criteria may include a user's age, gender, location, interest, profession, or the like. The criteria listed above are exemplary only and not intended to be limiting. Other criteria for targeting a user or group of users may be defined. The display method may be one of display methods depicted in FIGS. 12*a-h*. Once the seller completes inputting all of data pertaining to metadata, the visual interlock system may store and maintain the metadata at 650. The metadata, targeting information, and display method may be stored in the metadata management server 440.

Figure 8:
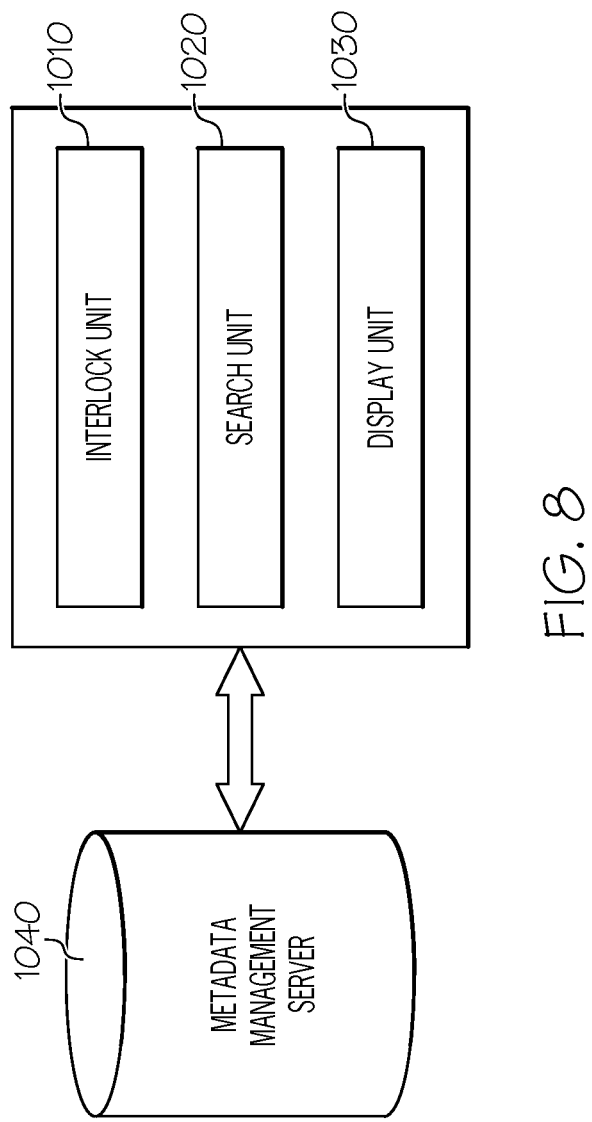
FIG. 8 depicts a schematic diagram of a visual interlock system for annotating video content with metadata.

FIG. 8 depicts a schematic diagram of a visual interlock system for annotating video content with metadata (i.e., product information). As shown, the visual interlock system includes interlock module 1010, search module 1020, display module, 1030, and metadata management server 1040. The interlock module 1010 may request NScreen service to simultaneously play video content on a smart TV and a user terminal. At this time, the same video content is played on both devices.

The search module 1020 may search the metadata maintenance server 1040 to search for metadata related to the video content. The search module 1020 may extract a user profile based on user behavior derived from Internet information related to the user. The search module 1020 may search for metadata and targeting information related to the user among the search results. In one example, the Internet information related to the user may contain the user's personal information used to register on websites (e.g., hobby, profession, age, gender, and the like), search history on a particular search engine, characteristics of frequently visited sites, and user interests predefined by the user. In other examples, other Internet information related to the user may be received.

The display module 1030 may display the metadata with the video content being played on the user terminal. The display module 1030 may display the metadata based on a configured display method once the user requests to view the metadata. Particularly, the display module 1030 may generate a user view which is composed of a video view displaying the video content and a metadata view displaying the visual objects annotated with metadata. The generated user view may be displayed on the screen of the user terminal. The display module 1030 may display the metadata based on the movement route showing the visual object's location in the video content. The location of the visual object may be tracked and used to display the metadata. In some examples, the metadata may be displayed nearby to the related visual object.

Figure 9:
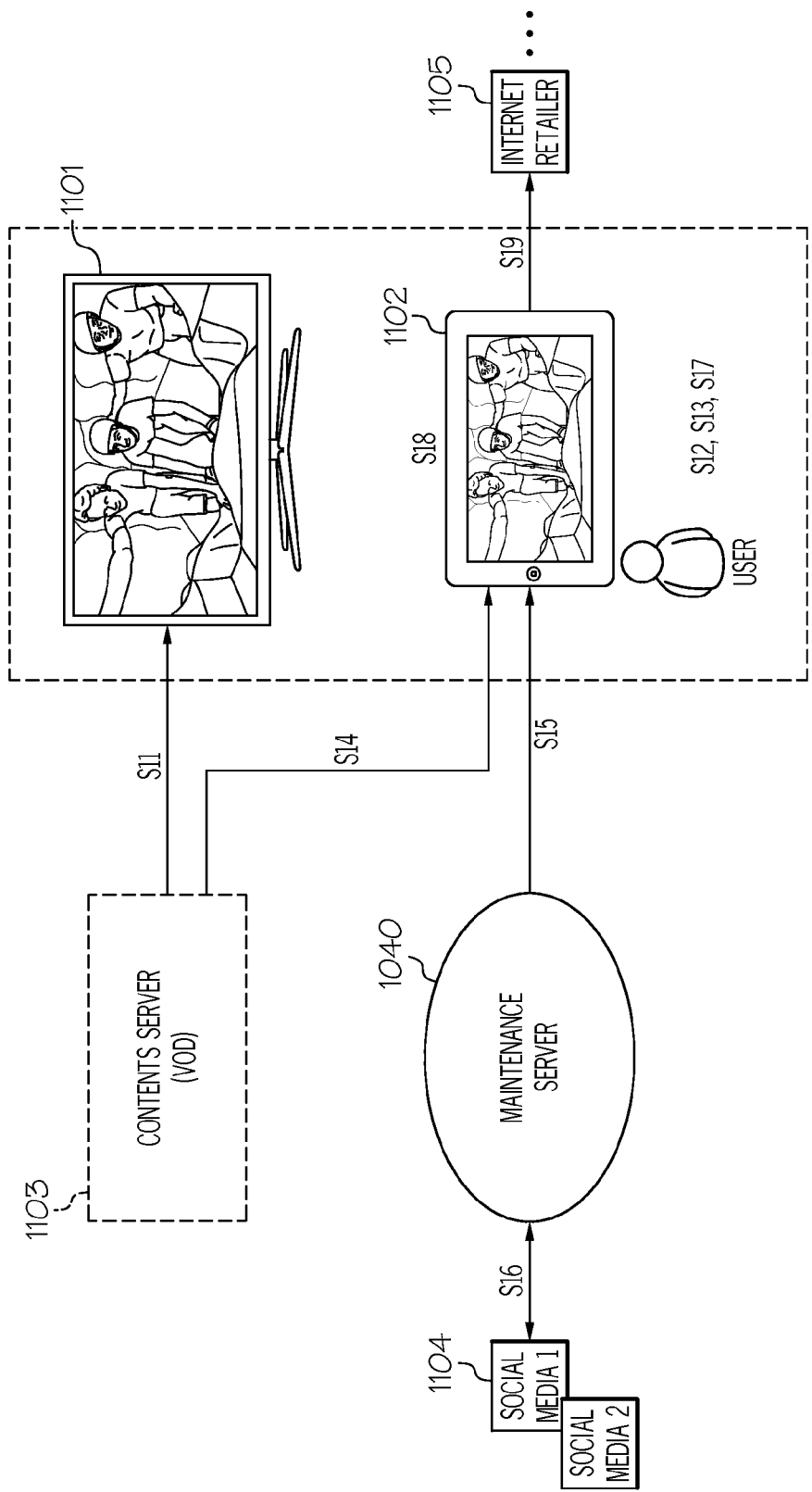
FIG. 9 depicts a schematic diagram of the visual interlock system including steps for annotating a video object with advertising information (e.g., metadata) based on a user request.

FIG. 9 depicts a schematic diagram of the visual interlock system including steps for annotating a video object with advertising information (e.g., metadata) based on a user request. At S11, a user selects and views video content existing in contents server 1103 on smart TV 1101. After a visual object of interest (i.e., product) appears in video content, the user decides he would like to see additional information (metadata) about the product at S12. On the user's mobile device (user terminal 1102), the video content as well as visual interlock system application are initiated at S13. At S14, the visual interlock system utilizes an NScreen service from contents server 1103. At this time, the same video content is displayed on the smart TV 1101 and the user terminal 1102.

At S15, the visual interlock system searches the metadata maintenance server 1040 for metadata related to the video content the user is currently viewing. At S16, the visual interlock system determines the user's interests using existing web information. For example, profile information for a social network site may be analyzed. The profile information may be used to tailor product information to the user. At S17, the user performs an action (e.g., lifting up the user terminal) to initiate a product information search for the product appearing in the video content. At S18, the visual interlock system displays the composition of tailored information received from maintenance server 1040 and video content being played on user terminal 1102. The visual interlock system may compose and display the video content and metadata according to a preconfigured display method. At S19, the user may select the product information displayed on the user terminal 1102 and move to a shopping site 1105 to purchase the product.

Figure 10:
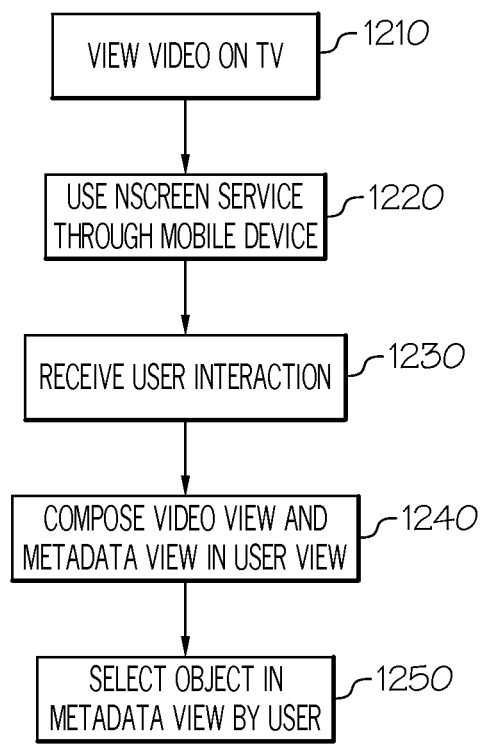
FIG. 10 depicts a method flow diagram for composing a video view and metadata view in a user view.

FIG. 10 depicts a method flow diagram for composing a video view and metadata view in a user view. At 1210, a user selects and views video content existing on a contents server on a smart TV. Following the user selection, the visual interlock system requests an NScreen service which allows for simultaneous display of video content on a smart TV and a mobile device (i.e., user terminal) at S1212. At this time, the same video content is displayed on a smart TV and a user terminal.

Figure 11:
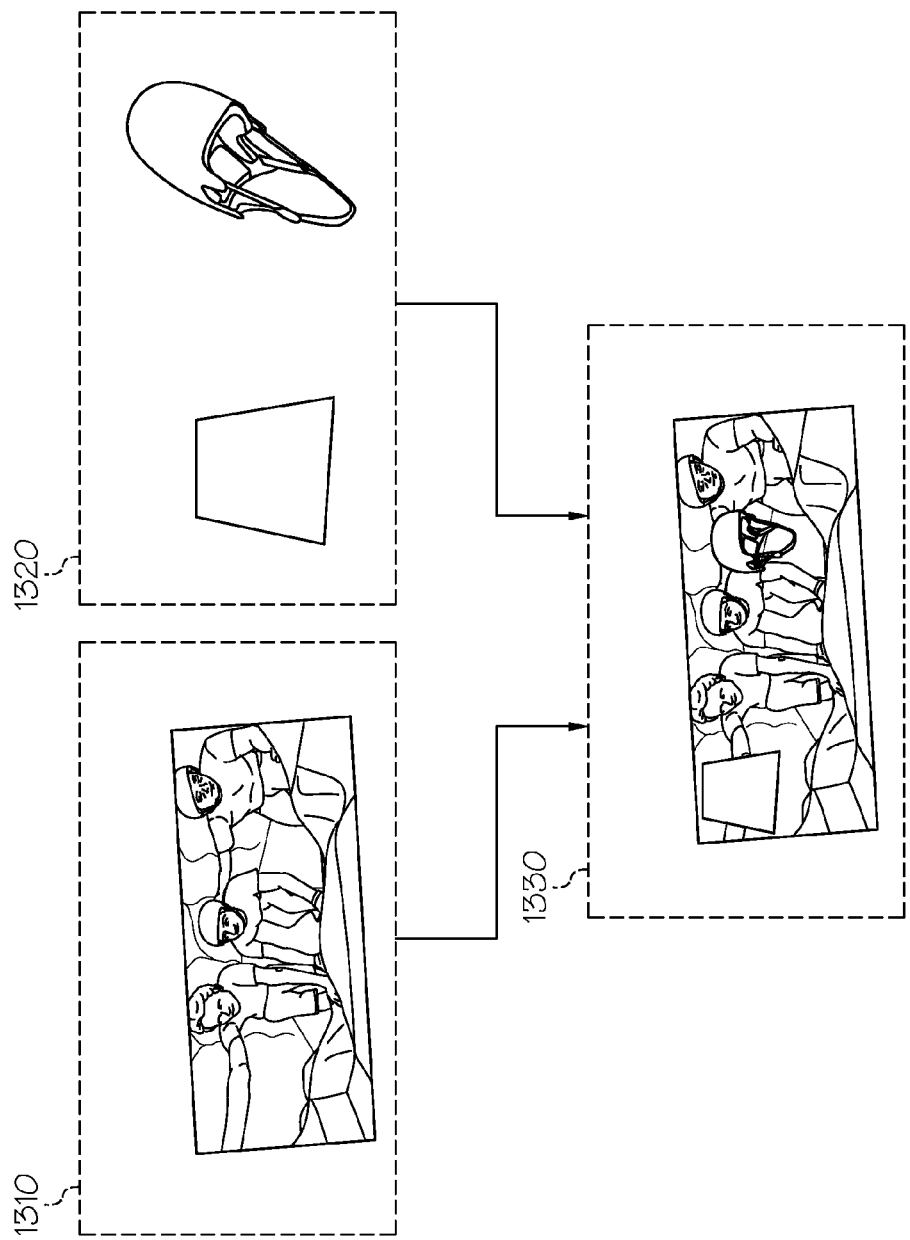
FIG. 11 depicts a video view, metadata view, and user view generated by composing the video view and metadata view.

At 1230, the visual interlock system recognizes a user's interaction which represents a user's wish to view metadata related to a video object being displayed in the video content. In one example, the user interaction may involve lifting up the user terminal. In other examples, a different user interaction may be defined. At 1240, the visual interlock system may compose a video view and a metadata view and display the composition as a user view. The user view may be displayed on a display of the user terminal. FIG. 11 depicts a video view, metadata view, and user view generated by composing the video view and metadata view. The user view 1330 is generated through composition (overlay) of information from the video view 1310 and the metadata view 1320. The video view 1310 is displayed for the user. In other words, the video view 1310 is the same as ordinary video play. The video view 1310 represents video content from the contents server which may be selected by the user. Based on a user request (e.g., lifting up the user terminal), metadata from the metadata maintenance server may be displayed in the metadata view 1320. The user views the composition of video view 1310 and metadata view 1320 as user view 1330.

Referring back to FIG. 10, the user may select (e.g., mouse click, touch, etc.) the product. The product may be linked to a web site (via a URL address) where the product is being offered for sale at 1250. Upon being redirected to the shopping site, the user may choose to purchase the product.

Figure 12A:
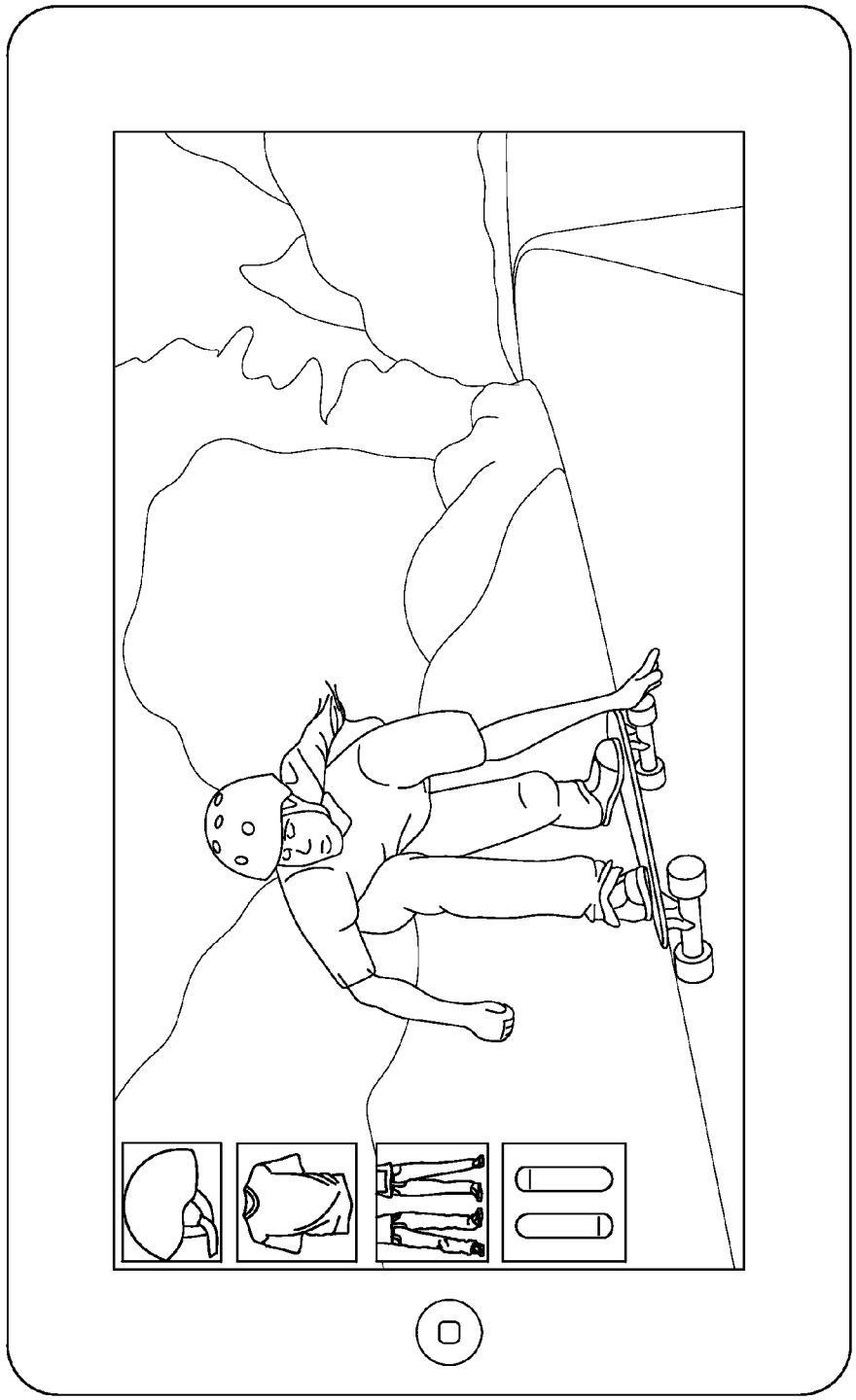
FIGS. 12*a-h* depict different display methods for displaying product information (i.e., metadata) related to a product.
Figure 12B:
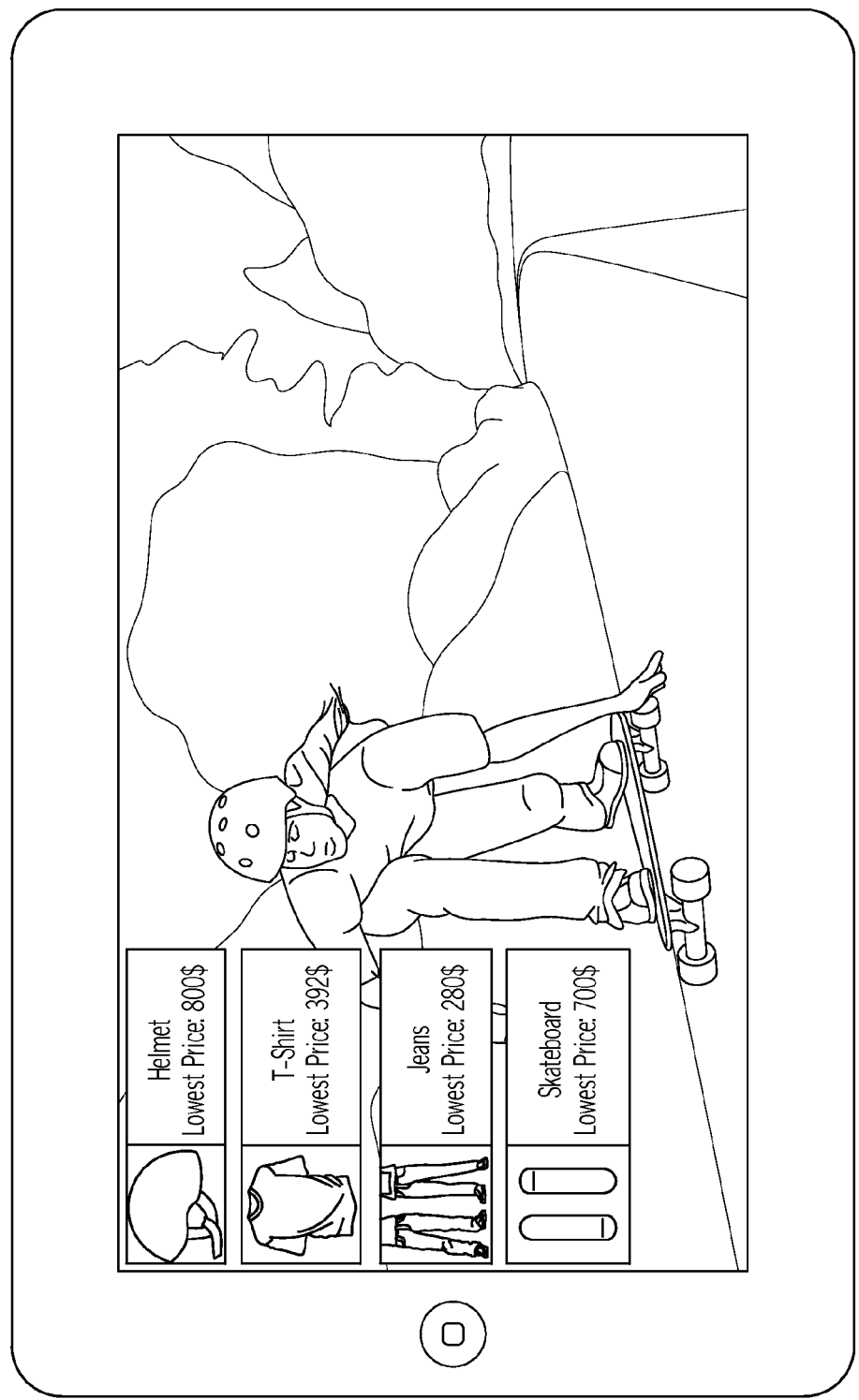
Figure 12C:
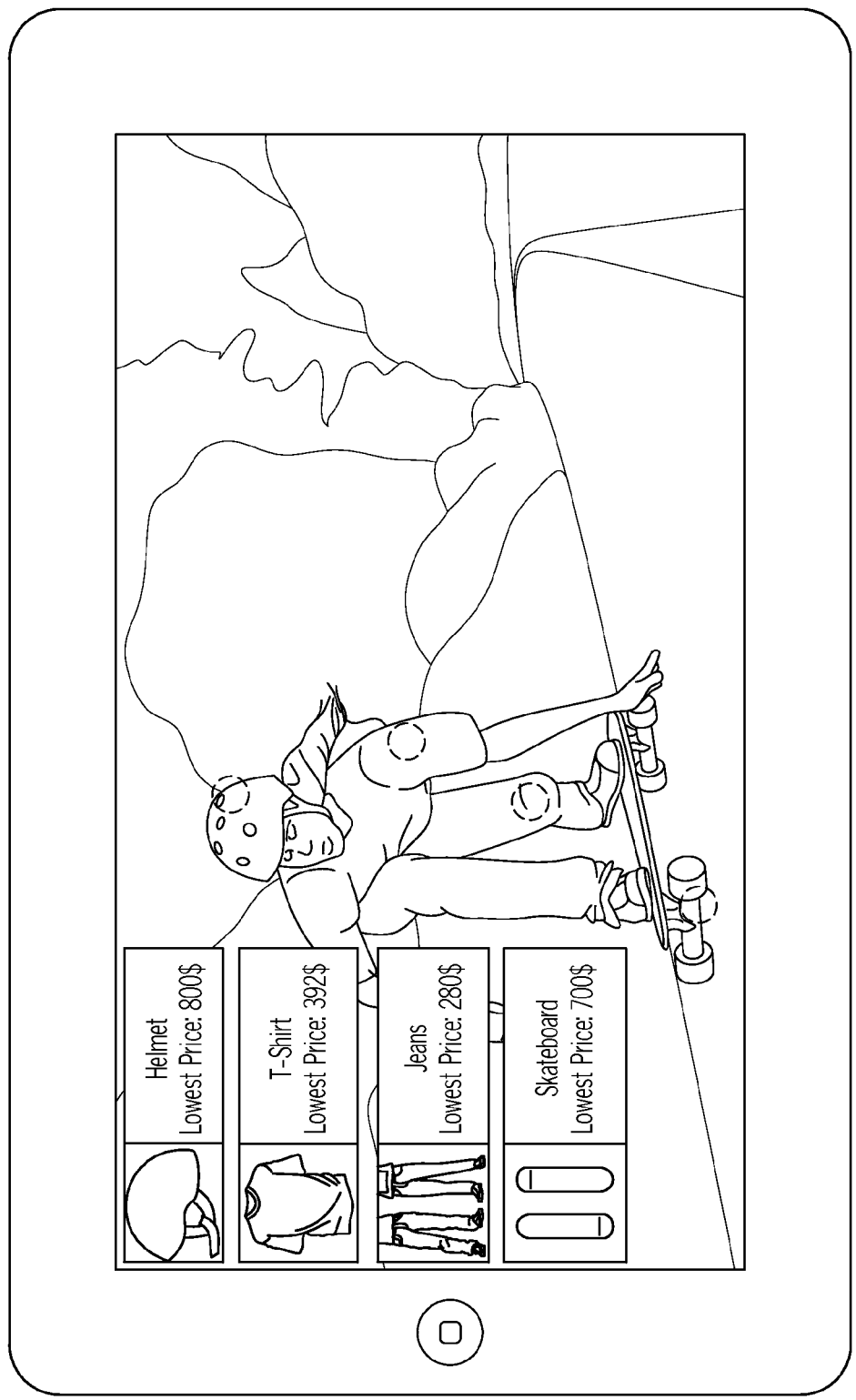
Figure 12D:
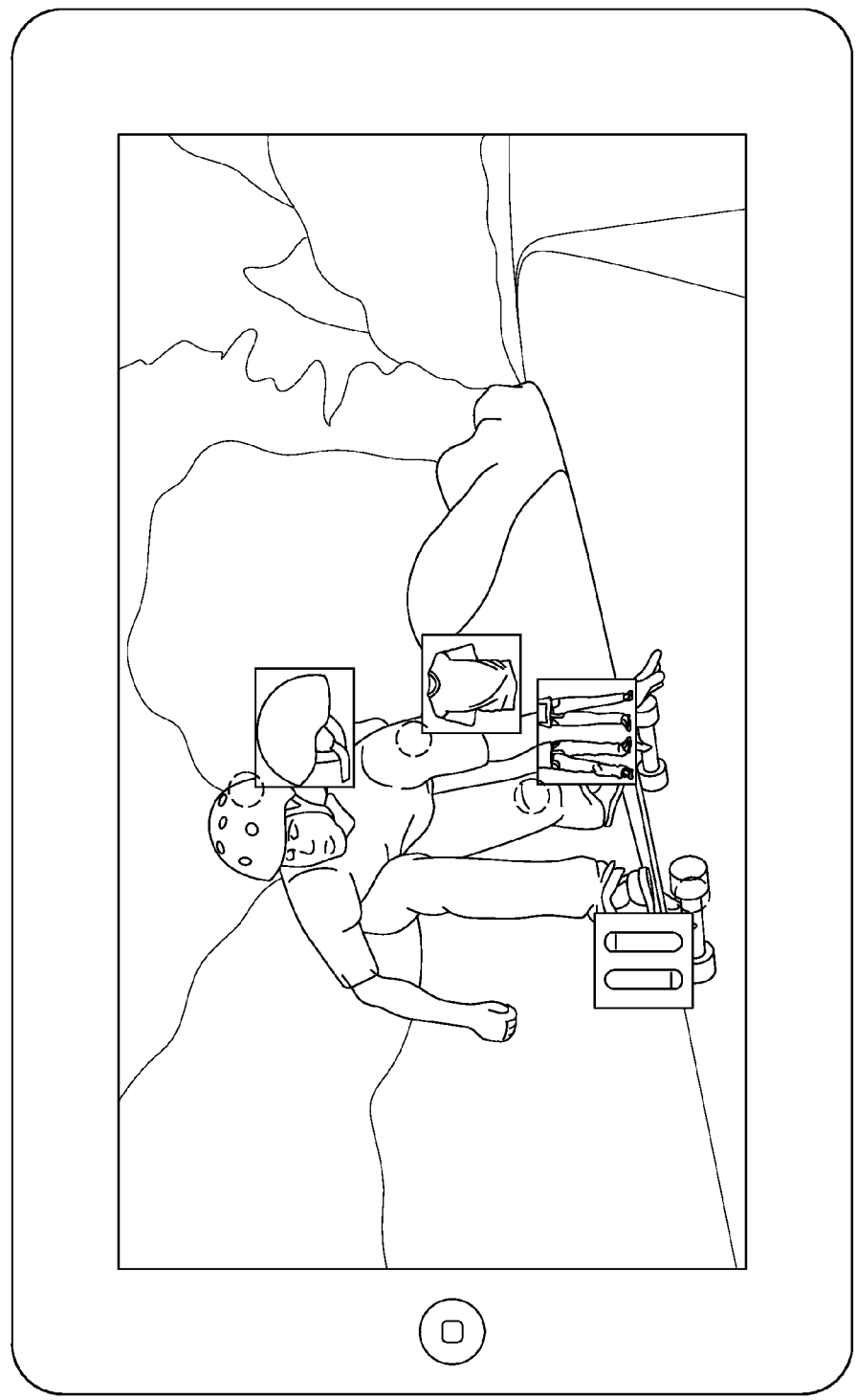
Figure 12E:
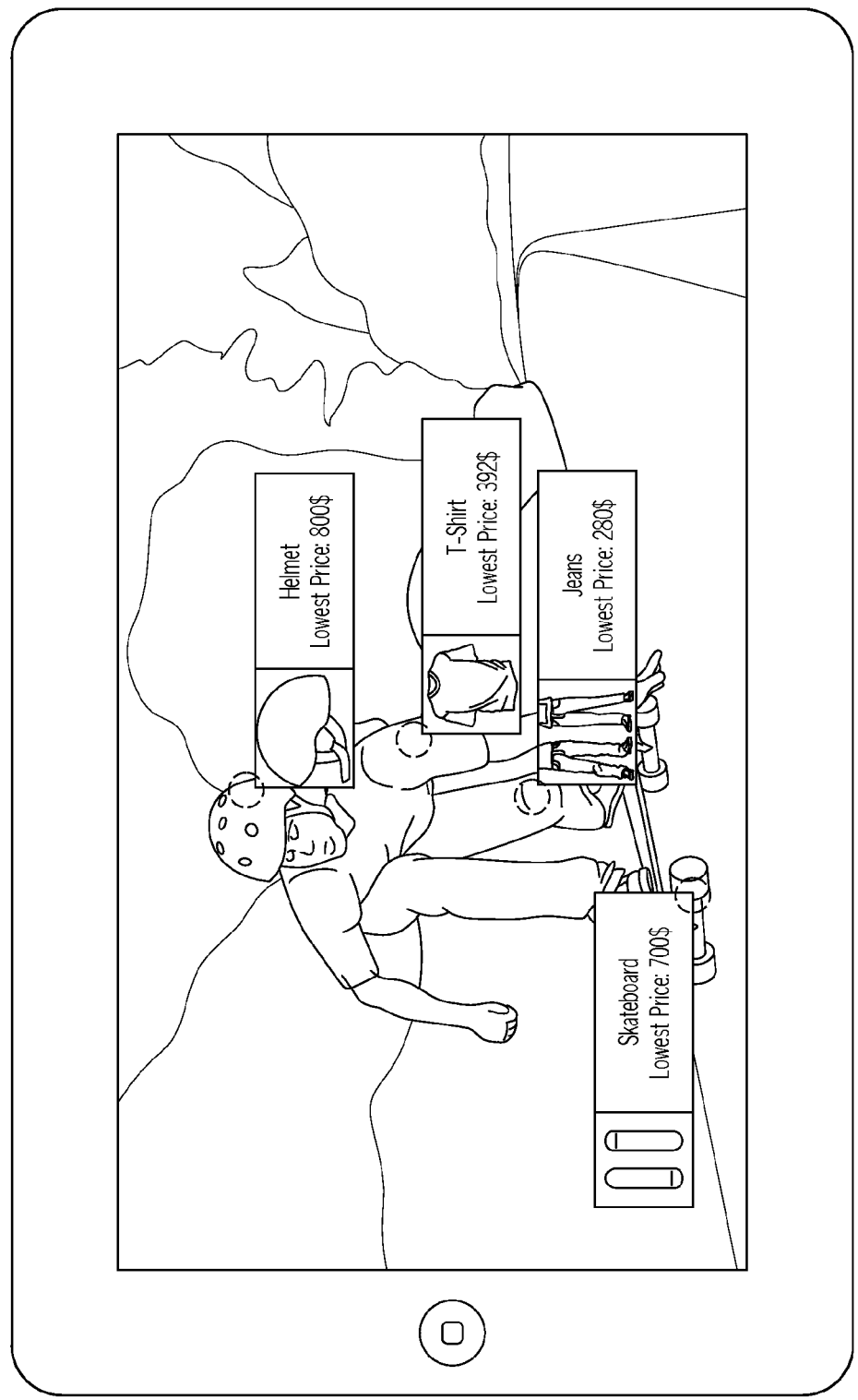
Figure 12F:
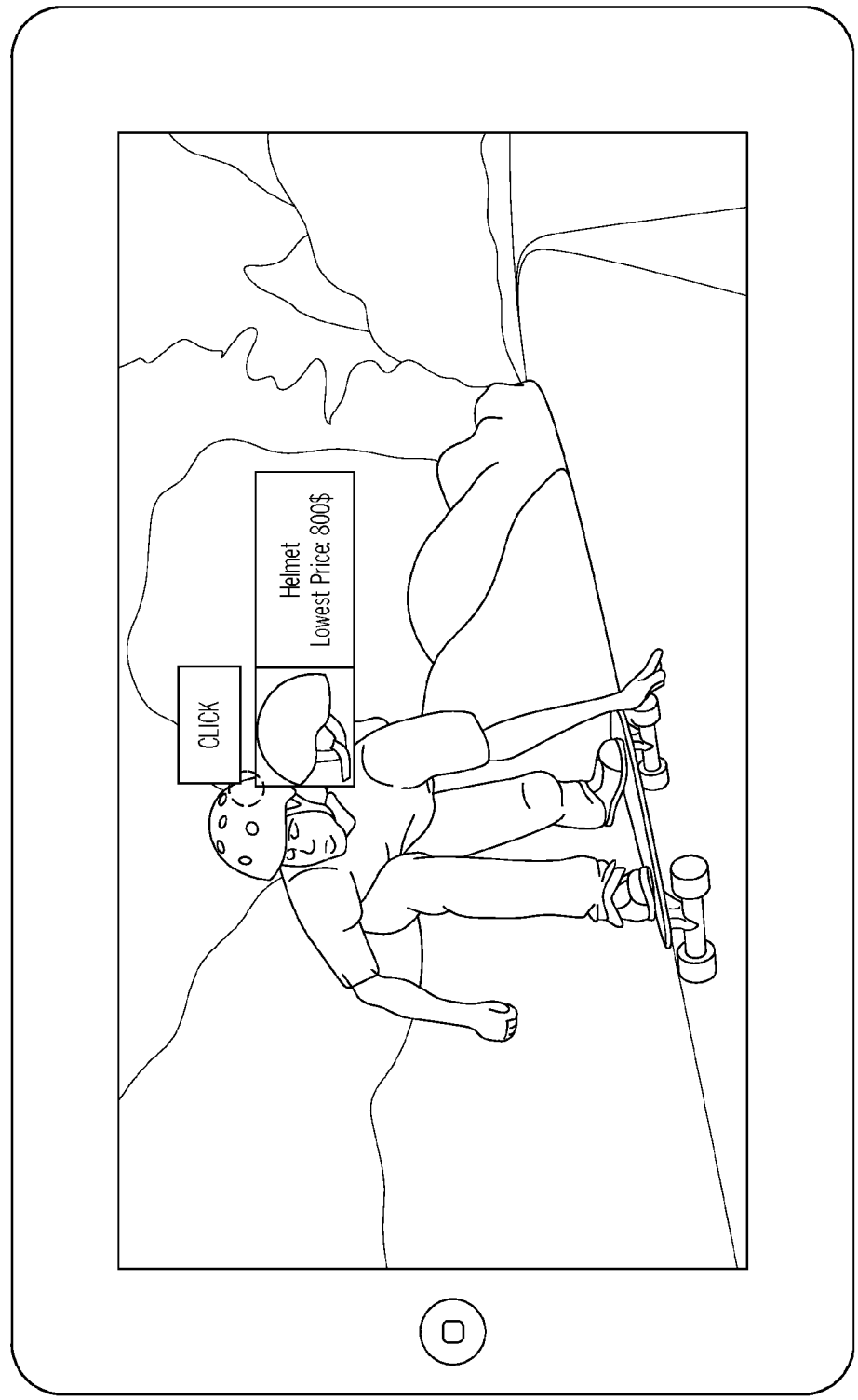
Figure 12G:
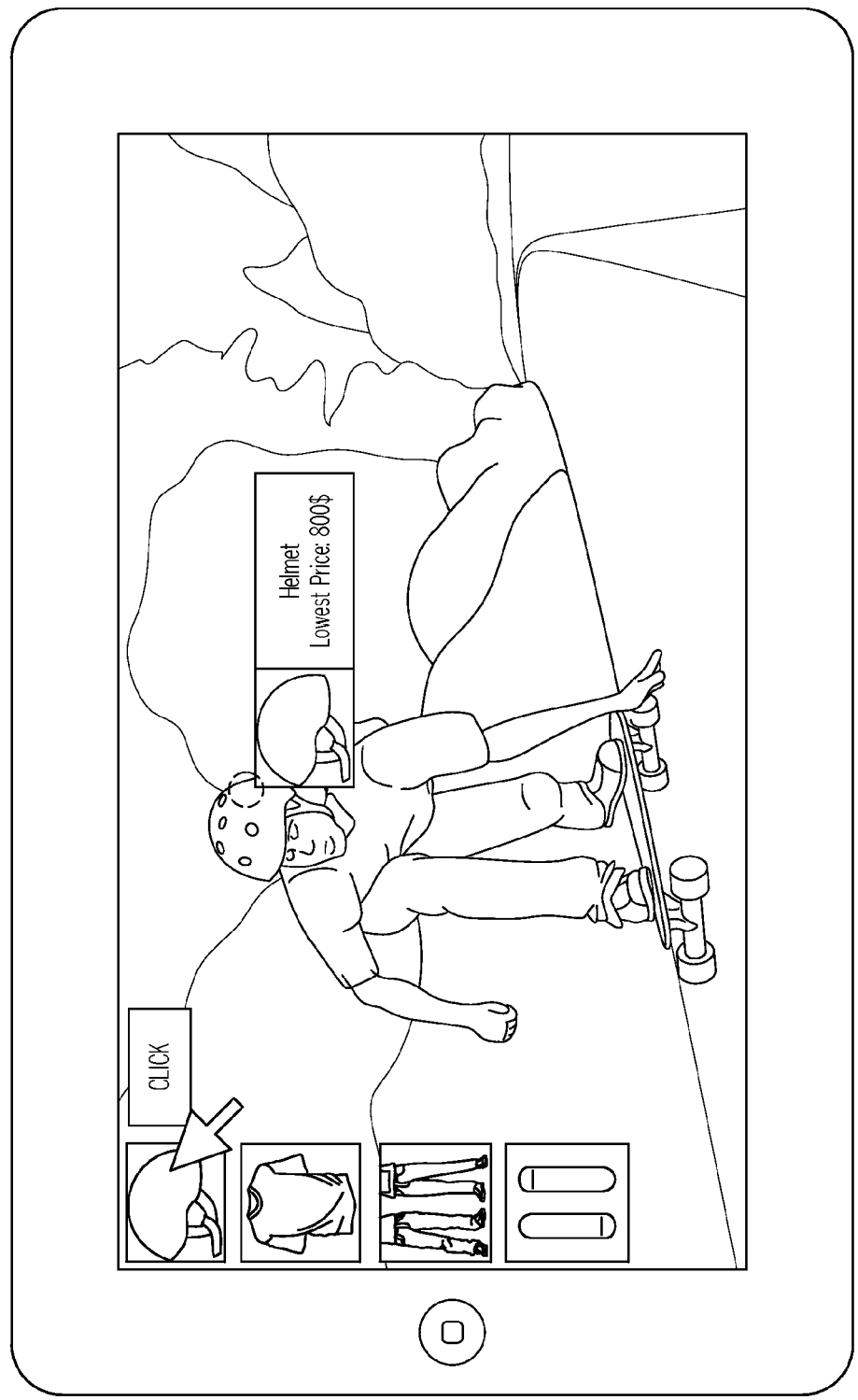
Figure 12H:
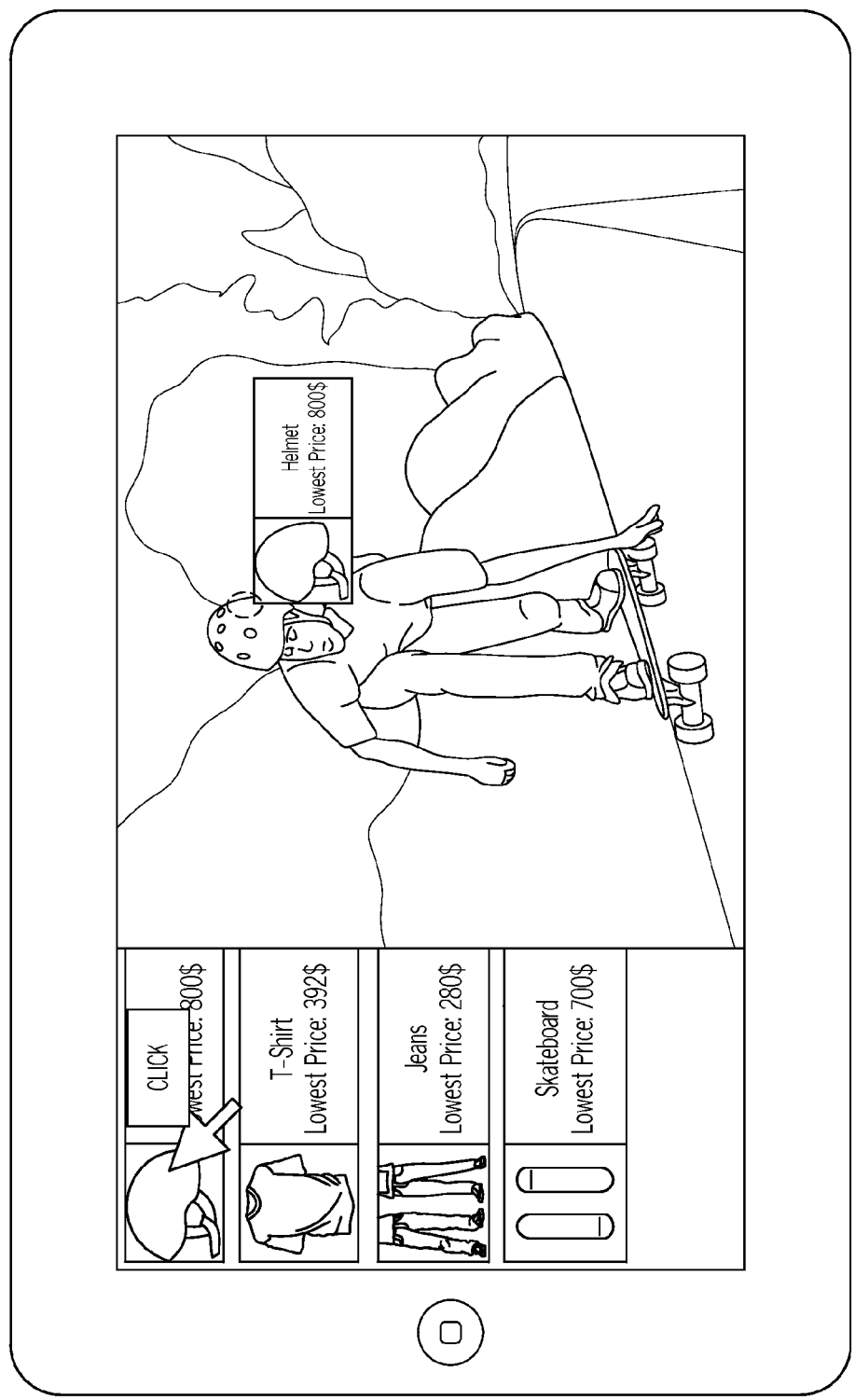

FIGS. 12a-h depict different display methods for displaying product information (i.e., metadata) related to a product. FIG. 12a shows a display method in which a product list is outputted on a side of the screen. FIG. 12b shows an output product list and respective product information for each product in the list. FIG. 12c shows a product list and product information that are outputted according to the location of a particular product on the screen. FIG. 12d shows the products displayed at various locations on the screen. FIG. 12e shows a list of products and product information displayed at various locations on the screen. The products and product information may be displayed at locations based on one or more visual objects in the video content. FIG. 12f shows a product and its product information selected by the user. In this example, only products and related information selected by the user may be displayed. FIG. 12g shows a product list displayed on a side of the screen. When the user selects a product from the product list, the product and product information are displayed for the user. As shown in FIG. 12g, the user has selected the skateboarder's helmet. The product and related information are displayed next to the actual helmet (i.e., visual object) being played on the screen. FIG. 12h shows a divided screen so that the video content being displayed is not blocked. As shown, the product list and video content are displayed in separate areas on the screen.

The visual interlock system may control the display of product information on the user screen through a toggle function. For example, the product information (i.e., metadata) may be displayed when the user lifts up the user terminal. When the user lifts up the user terminal again, the product information may be automatically hid. The toggle function will only allow the user to control when product information is to be displayed.

It should be noted that, in the method flow diagrams FIGS. 4 and 10 described herein, some steps may be added, some steps may be omitted, the order of the steps may be rearranged, and/or some steps may be performed simultaneously.

While shown and described herein as a video annotation solution, it is understood that the invention further provides various alternative embodiments. For example, in one embodiment, the invention provides a computer-readable/useable medium that includes computer program code to enable a computer infrastructure to provide financial transaction record generation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.).

In another embodiment, the invention provides a computer-implemented method for annotating video content with product information (i.e., metadata). In this case, a computer infrastructure, such as a computer system, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The example video interlock system may be described in the general context of computer-executable instructions, such as program modules, being executed by a computer. Generally, program modules include routines, programs, people, components, logic, data structures, and so on, that perform particular tasks or implements particular abstract data types. The example video interlock system may be practiced in distributed computing environments where tasks are performed by remote processing devices that are linked through a communications network. In a distributed computing environment, program modules may be located in both local and remote computer storage media including memory storage devices.

Furthermore, an implementation of the example video interlock system may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communications media" typically embodies computer readable instructions, data structures, program modules, or other data in a modulated data signal, such as carrier wave or other transport mechanism. Communications media also includes any information delivery media.

The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared, and other wireless media. Combinations of any of the above are also included within the scope of computer readable media.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed:

1. A video interlock system for displaying annotated video, comprising:
   at least one processor, memory, and a display; and
   a set of instructions that cause the at least one processor to perform the following:
   request a Network Screen (Nscreen) service based on a request of a content viewer, wherein the NScreen service allows for simultaneously displaying a same video being played on a first device of the content viewer to be played on a second device of the content viewer with virtual information annotations, and wherein the request of the content viewer comprises an action on the second device that requests the virtual information annotations;
   search for virtual information associated with a visual object in the video, wherein the virtual information is received from a video annotated by a content creator via an Nscreen service associated with at least a device of the content viewer and a device of the content creator and stored as metadata in a metadata maintenance server, the video being annotated by the content creator watching the video on the first device of the content creator, selecting the visual object in a same video simultaneously playing on the second device of the content creator, and configuring metadata related to the visual object onto the visual object on the second device of the content creator;
   determine a set of selected virtual information to present to the content viewer based on at least one of: a parameter and a social profile, of a content viewer, the parameter comprising a demographic of the content viewer and the social profile comprising metadata extracted from social media about the content viewer and a peer group of the content viewer;
   annotate the visual object in the video with the selected virtual information; and
   display the annotated video annotated on the second device of the content viewer, wherein an action of the content viewer activates and deactivates virtual information annotations of the annotated video.

2. The video interlock system of claim 1, the set of instructions further causing the at least one processor to generate virtual information associated with the visual object and store the virtual information as metadata in the metadata maintenance server.

3. The video interlock system of claim 1, wherein the first device of the content viewer is one of a television or mobile device and the second device of the content viewer is a mobile device, and wherein the first device of the content creator is one of a television or mobile device and the second device of the content creator is a mobile device.

4. The video interlock system of claim 1, wherein the virtual information includes at least one of a product category, product price, product description, product shipping information, multimedia data, social network service (SNS) message, or uniform resource locator (URL) address related to visual object.

5. The video interlock system of claim 1, the set of instructions further causing the at least one processor to input information related to a product and retrieve information related to the product in a Linking Open Data (LOD) environment.

6. The video interlock system of claim 1, wherein the metadata maintenance sever includes storage and the set of instructions further causes the at least one processor to perform storing and at least one of deleting, updating, reusing, or sharing virtual information, wherein the metadata maintenance server is separate from a contents server.

7. The video interlock system of claim 1, the displaying the annotated video further comprising displaying the video annotated with the metadata based on at least one of targeting information or a display method for providing personalized virtual information, wherein the targeting information and display method are defined by a virtual information provider.

8. The video interlock system of claim 1, the searching for visual information further comprising searching for metadata related to the visual object based on at least one of targeting information and user profile information, wherein the user profile information is generated based on a user behavior derived from one or more Internet searches.

9. The video interlock system of claim 1, the displaying the annotated video further comprising displaying a composed video view, wherein the composed video view comprises a metadata view and a user view.

10. The video interlock system of claim 1, the set of instructions further causing the at least one processor to display the metadata based on movement route information.

11. The video interlock system of claim 10, wherein the movement route information is stored in the metadata maintenance server.

12. A method for displaying annotated video annotated, comprising:
   requesting a Network Screen (Nscreen) service based on a request of a content viewer, wherein the NScreen service allows for simultaneously displaying a same video being played a first device of the content viewer to be placed on a second device of the content viewer with virtual information annotations, and wherein the request of the content viewer comprises an action on the second device that requests the virtual information annotations;

searching for virtual information related to a visual object in the video, wherein the virtual information is received from a video annotated by a content creator via an Nscreen service associated with at least a device of the content viewer and a device of the content creator and stored as metadata in a metadata maintenance server, the video being annotated by the content creator watching the video on the first device of the content creator, selecting the visual object in a same video simultaneously playing on the second device of the content creator, and configuring metadata related to the visual object onto the visual object on the second device of the content creator;

determining a set of selected virtual information to present to the content viewer based on at least one of: a parameter and a social profile, of a content viewer, the parameter comprising a demographic of the content viewer and the social profile comprising metadata extracted from social media about the content viewer and a peer group of the content viewer;

annotating the visual object in the video with the selected virtual information; and displaying the video annotated with the metadata on the second device of the content viewer, wherein an action of the content viewer activates and deactivates virtual information annotations of the annotated video.

13. The method of claim 12, further comprising generating virtual information associated with the visual object and storing the virtual information as metadata in the metadata maintenance server.

14. The method of claim 12, wherein the first device of the content viewer is one of a television or mobile device and the second device of the content viewer is a mobile device, and wherein the first device of the content creator is one of a television or mobile device and the second device of the content creator is a mobile device.

15. The method of claim 12, wherein the virtual information includes at least one of a product category, product price, product description, product shipping information, multimedia data, social network service (SNS) message, or uniform resource locator (URL) address related to visual object.

16. The method of claim 12, further comprising inputting information related to a product and retrieving information related to the product using a Linking Open Data (LOD) environment.

17. The method of claim 12, further comprising performing storing and at least one of deleting, updating, reusing, or sharing virtual information on a metadata maintenance server, wherein the metadata maintenance server is separate from a contents server.

18. The method of claim 12, further comprising displaying the video annotated with the metadata based on at least one of targeting information or a display method for providing personalized virtual information, wherein the targeting information and display method are defined by a virtual information provider.

19. The method of claim 12, further comprising searching for metadata related to the visual object based on at least one of targeting information and user profile information, wherein the user profile information is generated based on a user behavior derived from one or more Internet searches.

20. The method of claim 12, further comprising displaying a composed video view, wherein the composed video view comprises a metadata view and a user view.

21. The method of claim 12, further comprising displaying the metadata based on movement route information, wherein the movement route information is stored in the metadata maintenance server.

22. A computer program product for displaying annotated video annotated, the computer program product comprising a computer readable storage device, and program instructions stored on the computer readable storage device, to:

request a Network Screen (Nscreen) service based on a request of a content viewer, wherein the NScreen service allows for simultaneously displaying the same video being played a first device of the content viewer to be placed on a second device of the content viewer with virtual information annotations, and wherein the request of the content viewer comprises an action on the second device that requests the virtual information annotations;

generate virtual information associated with a visual objects in the video, wherein the virtual information is received from a video annotated by a content creator via an Nscreen service associated with at least a device of the content viewer and a device of the content creator and stored as metadata, the video being annotated by the content creator watching the video on the first device of the content creator, selecting the visual object in a same video simultaneously playing on the second device of the content creator, and configuring metadata related to the visual object onto the visual object on the second device of the content creator;

search for metadata related to a visual object in the video, wherein the metadata is stored in a metadata maintenance server;

determine a set of selected virtual information to present to the content viewer based on at least one of: a parameter and a social profile, of a content viewer, the parameter comprising a demographic of the content viewer and the social profile comprising metadata extracted from social media about the content viewer and a peer group of the content viewer;

annotate the visual object in the video with the selected virtual information; and display the annotated video on the second device of the content viewer, wherein an action of the content viewer activates and deactivates virtual information annotations of the annotated video.

* * * * *